United States Patent

[11] 3,621,386

[72] Inventor John R. Purcell
Downers Grove, Ill.
[21] Appl. No. 885,576
[22] Filed Dec. 16, 1969
[45] Patented Nov. 16, 1971
[73] Assignee The United States of America as represented by the United States Atomic Energy Commission

[54] METHOD OF DETERMINING BONDING IN A COMPOSITE SUPERCONDUCTOR
6 Claims, 2 Drawing Figs.

[52] U.S. Cl. 324/64
[51] Int. Cl. G01r 27/14
[50] Field of Search 324/64, 71

[56] References Cited
UNITED STATES PATENTS
3,428,891 2/1969 Purcell et al. 324/64

*Primary Examiner*—Edward E. Kubasiewicz
*Attorney*—Roland A. Anderson

ABSTRACT: Bond quality between a superconductor and a coating thereabout of normal material having high electrical conductivity at superconducting temperatures is measured by interrupting the electrical continuity of the superconductor and cooling the superconductor and coating to a temperature to cause the superconductor to assume a superconducting state. A current of known value is applied to the superconductor and the voltage drop along the coating on both sides of the electrical discontinuity is measured to provide a measure of bond quality.

PATENTED NOV 16 1971 3,621,386

Inventor
John R. Purcell

Attorney

METHOD OF DETERMINING BONDING IN A COMPOSITE SUPERCONDUCTOR

CONTRACTUAL ORIGIN OF THE INVENTION

The invention described herein was made in the course of, or under, a contract with the United States Atomic Energy Commission.

BACKGROUND OF THE INVENTION

As the size requirements for magnetic fields increase, the desirability and utility of superconducting magnets increase. Present superconducting magnets are made using either single or multiple filament composite superconductors. The composite superconductor comprises one or more superconductors surrounded by a coating of normal material having high electrical conductivity at superconducting temperatures, which coating acts as an insulator between the superconductors and also an electrical shunt when normalcy occurs. One problem that presently exists in the art is determining the quality of the bond between the superconductors and the coating disposed thereabout. Without good bonding between the superconductor and the coating, normal regions are created in the superconductor. These normal regions cause high charging losses in a magnet made from the composite superconductors and also may propagate to effect quenching of the magnet.

Accordingly, it is the object of the present invention to provide a method for measuring the quality of bonding between a superconductor and a coating thereabout.

Other objects of the invention will become more apparent as the detailed description proceeds.

SUMMARY OF THE INVENTION

In general, the method of the present invention comprises interrupting the electrical continuity of the superconductor and cooling the superconductor and the coating thereabout to a temperature to cause the superconductor to assume a superconducting state. A current of known value is applied to the superconductor and the voltage drop is measured along the coating on both sides of the electrical discontinuity.

BRIEF DESCRIPTION OF THE DRAWINGS

Further understanding of the present invention may be obtained from consideration of the accompanying drawings wherein.

The present invention is operable on composite superconductors wherein a coating of normal material having high electrical conductivity at superconducting temperatures is disposed about one or more superconductors. To effect the present invention, a small portion of the superconductor is removed to effect a break in the electrical conductivity thereof. The composite superconductor is cooled to superconducting temperatures and a current below the critical current for the superconductor is passed therethrough. A voltmeter is connected to the coating around the superconductor to measure the voltage drop therealong on either side of the discontinuity in the superconductor. The voltage value as measured is directly proportional to the resistance of the coating through which the current is forced to pass by the break in the superconductor and is also indicative of the bond between the coating and the superconductor.

Figure 1:
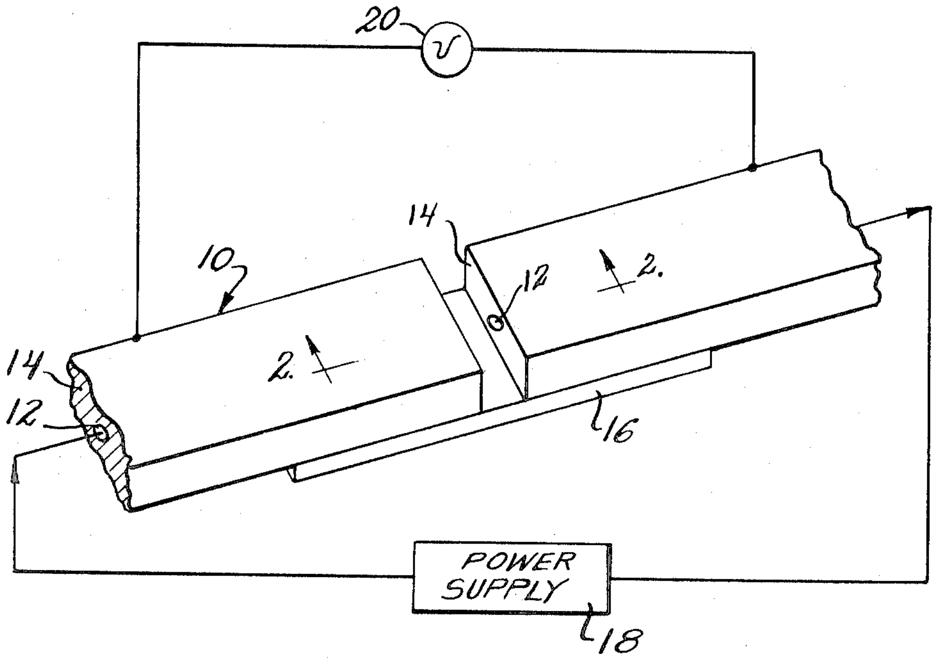
FIG. 1 is a drawing of an apparatus for the practice of the method of the present invention.
Figure 2:
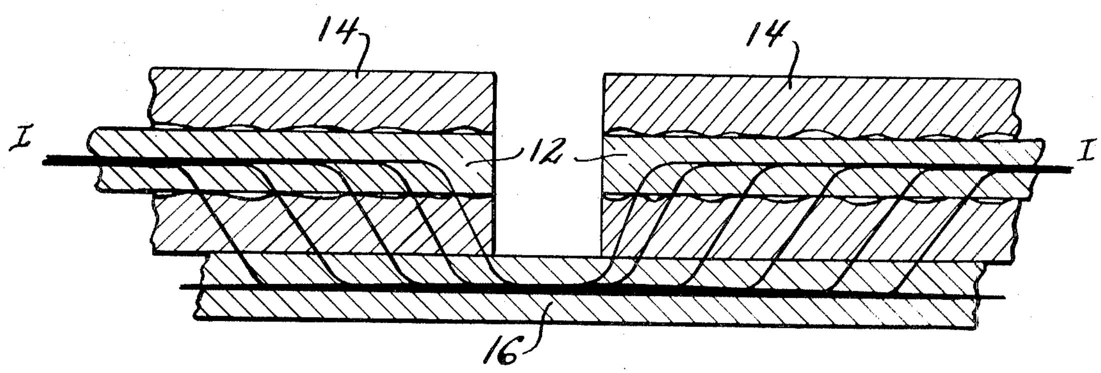
FIG. 2 is an enlarged cross section of FIG. 1 through lines 2—2.

Further appreciation of the method of the present invention is obtained by referring to FIGS. 1 and 2. In FIG. 1, a composite superconductor 10 comprises a superconductor 12 having a coating 14 thereabout of a material having high electrical conductivity at superconducting temperatures, such as copper. A cut is made through the superconductor 12 and the coating 14 so as to provide an electrical discontinuity in the superconductor 12. A member 16 of normal material having high electrical conductivity at superconducting temperatures (for example, copper) is soldered, using lead-tin solder, to the coating 14 so as to be in intimate electrical contact therewith on either side of the discontinuity effected in the superconductor 12. A power supply 18 is connected to provide a current flow through the superconductor 12 and a voltmeter 20 is connected to the coating 14 on either side of the discontinuity effected in the superconductor 12.

In operation, the composite superconductor 10 and the member 16 soldered thereto are cooled to the superconducting temperature of the superconductor 12. A current having a value I less than the critical current value of the superconductor 12 is generated by the power supply 18 and passed through the superconductor 12. The discontinuity in the superconductor 12 causes the current I to flow through the coating 14 and member 16 therearound and the voltage drop created thereby is measured by voltmeter 20 to provide a measure of the bond quality between the superconductor 12 and the coating 14.

Further appreciation of this method may be obtained by considering FIG. 2 wherein an enlarged portion of the apparatus of FIG. 1 is shown about the discontinuity in the superconductor 12. As shown in FIG. 2, the current flowing along the superconductor 12 is forced to flow by the discontinuity in the superconductor 12 through the coating 14 and member 16 around the discontinuity. Depending upon the bond quality of the superconductor 12 to the coating 14, the current paths of the current will extend from the discontinuity on either side thereof. With good bonding, the current paths will extend for approximately 1 inch on either side of the discontinuity in the superconductor 12. Thus, beyond one inch, current flow will be entirely in the superconductor and there will be no voltage gradient between the superconductor 12 and the coating 14. The total voltage drop measured by the voltmeter 20 will thus extend for a good bond between the superconductor 12 and coating 14 for a distance along coating 14 approximately 2 inches. Where poor bond quality exists, it has been found that the current paths extend on either side of the discontinuity approximately 5 inches and, beyond the 5-inch distance, current flows entirely within the superconductor 12. Thus, for poor bonding, voltage gradients will be found between the coating 14 and the superconductor 12 for a distance of approximately 5 inches on either side of the discontinuity, which voltage gradients are summed by the voltmeter 20 to provide a measure of the quality of the bonding between the superconductor and the coating 14. As the bond quality deteriorates, the voltage drop measured by voltmeter 20 becomes greater. It will thus be appreciated that to effect the method of the present invention the voltmeter should be positioned so as to measure the voltage drop along the coating 14 a distance on either side of the discontinuity sufficient to encompass the voltage gradients generated by poor bonding, that is, approximately five inches on either side of the discontinuity.

It will be further appreciated that the member 16 should be attached to the coating 14 with a low-resistance bond to provide as intimate electrical contact therewith as possible. Satisfactory operation has been effected using lead-tin solder where copper was bonded to copper. The discontinuity in the superconductor 12 does not have to be large to practice the present invention. A cut equal to one saw blade thickness has been found satisfactory (approximately 30 mils).

It has been further found that the bonding between the superconductor 12 and the coating 14 may be magnetic-field-sensitive, that is, the bond resistance characteristics change in a magnetic field. Since composite superconductors are used to form magnets having high magnetic fields, the bond characteristics of such composite superconductors may be more accurately determined according to the present invention if the voltage drop measurements are effected in the presence of a magnetic field having a value determined from the ultimate use of the composite superconductor in question. For example, where the composite superconductor is being utilized in a magnet where it will be exposed to a 30-kilogauss field, then the method of the present invention should be effected with the composite superconductor being subjected to a 30-kilogauss magnetic field.

It has been found that when tests are conducted according to the aforedescribed method on composite superconductors containing one or more superconductors, a reliable measure will be obtained of the bonding quality of the superconductor and that such tests are representative of the quality of the bond over the total length of the superconductor.

Persons skilled in the art will, of course, readily adapt the general teachings of the invention to embodiments far different from the embodiments illustrated. Accordingly, the scope of the protection afforded the invention should not be limited to the particular embodiment illustrated in the drawings and described above but should be determined only in accordance with the appended claims.

The embodiments of the invention in which an exclusive property or privilege is claimed are defined as follows;

1. A method for measuring bond quality between a superconductor and a coating thereabout of material having high electrical conductivity at superconducting temperatures comprising interrupting the electrical continuity of said superconductor, cooling said superconductor and coating to a temperature to cause said superconductor to assume a superconducting state, applying a current of known value to said superconductor, and measuring the voltage drop along said coating on both sides of said electrical discontinuity.

2. A method according to claim 1 further including generating a magnetic field of known value and subjecting said superconductor to said magnetic field during said current applying and voltage drop measuring steps.

3. The method according to claim 1 wherein interrupting the electrical continuity of said superconductor comprises removing a portion of said superconductor and coating, and mounting an electrical conductor in intimate electrical contact with said coating to span the removed portion of said superconductor and coating.

4. The method according to claim 1 wherein said applied current has a value less than the critical current for said superconductor.

5. The method according to claim 1 wherein said voltage drop is measured over a distance greater than one inch extending on either side of said superconductor discontinuity.

6. The method according to claim 1 wherein said voltage drop is measured over a distance extending approximately 5 inches on either side of said superconductor discontinuity.